US010762901B2

(12) United States Patent
Liang et al.

(10) Patent No.: US 10,762,901 B2
(45) Date of Patent: Sep. 1, 2020

(54) ARTIFICIAL INTELLIGENCE BASED METHOD AND APPARATUS FOR CLASSIFYING VOICE-RECOGNIZED TEXT

(71) Applicant: BEIJING BAIDU NETCOM SCIENCE AND TECHNOLOGY CO., LTD., Beijing (CN)

(72) Inventors: Yichuan Liang, Beijing (CN); Guang Ling, Beijing (CN); Yingzhan Lin, Beijing (CN); Wenmin Wang, Beijing (CN); Zeying Xie, Beijing (CN); Yin Zhang, Beijing (CN); Wei Xu, Beijing (CN); Chao Zhou, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 153 days.

(21) Appl. No.: 16/054,970

(22) Filed: Aug. 3, 2018

(65) Prior Publication Data

US 2019/0066675 A1 Feb. 28, 2019

(30) Foreign Application Priority Data

Aug. 23, 2017 (CN) .......................... 2017 1 0728382

(51) Int. Cl.
*G06F 17/27* (2006.01)
*G10L 15/22* (2006.01)
(Continued)

(52) U.S. Cl.
CPC .............. *G10L 15/22* (2013.01); *G06F 3/167* (2013.01); *G06F 16/00* (2019.01); *G06F 40/284* (2020.01);
(Continued)

(58) Field of Classification Search
CPC ........ G06F 16/353; G06F 40/20; G06F 40/30; G06F 16/313; G06F 16/3338;
(Continued)

(56) References Cited

U.S. PATENT DOCUMENTS

| 5,642,435 A | * | 6/1997 | Loris | ..................... | G06K 9/2054 |
| | | | | | 382/224 |
| 6,192,360 B1 | * | 2/2001 | Dumais | ................ | G06K 9/6269 |

(Continued)

FOREIGN PATENT DOCUMENTS

| CN | 103500195 A | 1/2014 |
| CN | 103577476 A | 2/2014 |

(Continued)

*Primary Examiner* — Vijay B Chawan
(74) *Attorney, Agent, or Firm* — Lathrop GPM LLP (57) ABSTRACT

Embodiments of the present disclosure disclose an artificial intelligence based method and apparatus for classifying a voice-recognized text. A specific embodiment of the method includes: acquiring a current interactive text of a voice query from a user; analyzing the current interactive text using a lexical analyzer to obtain a current lexical structure; determining whether the current lexical structure matches a template of a category in a classifier; and classifying, if the current lexical structure matches the template of the category in the classifier, the current interactive text corresponding to the current lexical structure into the category belonging to the matched template. The embodiment can fast classify texts, effectively reduce the magnitude of manually annotated texts, and improve the annotation efficiency in intelligent voice interaction services.

16 Claims, 5 Drawing Sheets

(51) Int. Cl.
*G10L 15/193* (2013.01)
*G10L 15/06* (2013.01)
*G06F 3/16* (2006.01)
*G06F 16/00* (2019.01)
*G06F 40/284* (2020.01)
*G06N 20/00* (2019.01)

(52) U.S. Cl.
CPC .......... G10L 15/063 (2013.01); G10L 15/193 (2013.01); *G06N 20/00* (2019.01); *G10L 2015/0633* (2013.01); *G10L 2015/223* (2013.01); *G10L 2015/228* (2013.01)

(58) Field of Classification Search
CPC .. G06F 16/35; G06F 16/355; G06F 16/90332; G06F 16/972; G06F 40/117; G06F 40/58; G06N 20/00; G06N 5/04; G06N 3/0445; G06N 3/0454; G06N 3/08; G06N 5/022; G06N 5/025; G06N 5/046; G10L 15/1815; G10L 15/07; G10L 15/1822; G10L 15/22; G10L 25/83; G10L 15/14
USPC ..... 707/999.006, 740, 749, 768, 771, 0.003, 707/999.005, 999.104; 715/234, 205; 704/9, 240, 257, 231, 235, 260; 706/10, 706/12, 20, 14, 45, 46
See application file for complete search history.

(56) References Cited

U.S. PATENT DOCUMENTS

| | | | | |
|---|---|---|---|---|
| 6,704,905 B2* | 3/2004 | Fukushige | ............ | G06Q 50/22 715/234 |
| 8,195,626 B1 | 6/2012 | Goodwin | | |
| 8,452,798 B2* | 5/2013 | Myaeng | ............ | G06F 16/3338 707/768 |
| 8,868,468 B2* | 10/2014 | Peng | ........................ | G06N 5/04 706/10 |
| 10,402,501 B2* | 9/2019 | Wang | .................. | G10L 15/1822 |
| 2002/0022956 A1* | 2/2002 | Ukrainczyk | .......... | G06F 16/313 704/9 |
| 2002/0103775 A1* | 8/2002 | Quass | .................... | G06N 20/00 706/12 |
| 2002/0152051 A1* | 10/2002 | Fukushige | ............. | G06Q 50/22 702/179 |
| 2003/0221163 A1* | 11/2003 | Glover | .................. | G06F 16/353 715/205 |
| 2005/0066236 A1* | 3/2005 | Goeller | ............... | G06F 11/0748 714/39 |
| 2006/0143175 A1* | 6/2006 | Ukrainczyk | .......... | G06F 16/353 |
| 2008/0154595 A1* | 6/2008 | Nelken | .................... | G10L 15/14 704/240 |
| 2009/0313217 A1* | 12/2009 | Signorini | .............. | G06F 16/353 |
| 2011/0047161 A1* | 2/2011 | Myaeng | ............. | G06F 16/3338 707/740 |
| 2011/0191270 A1* | 8/2011 | Peng | ........................ | G06N 5/04 706/10 |
| 2013/0110518 A1* | 5/2013 | Gruber | .................. | G10L 15/265 704/275 |
| 2013/0332172 A1* | 12/2013 | Prakash | .............. | H04M 1/6075 704/270.1 |
| 2015/0081279 A1* | 3/2015 | Suleman | .................. | G06F 16/35 704/9 |
| 2018/0204135 A1* | 7/2018 | Narasimha | ............. | G06N 20/00 |
| 2018/0225553 A1* | 8/2018 | Ha | ........................ | G06F 16/355 |
| 2018/0307904 A1* | 10/2018 | Patil | ........................ | G06K 9/628 |
| 2018/0314689 A1* | 11/2018 | Wang | ........................ | G06F 40/58 |

FOREIGN PATENT DOCUMENTS

| | | |
|---|---|---|
| CN | 105183850 A | 12/2015 |
| CN | 106328147 A | 1/2017 |
| CN | 106503184 A | 3/2017 |

* cited by examiner

ARTIFICIAL INTELLIGENCE BASED METHOD AND APPARATUS FOR CLASSIFYING VOICE-RECOGNIZED TEXT

CROSS-REFERENCE TO RELATED APPLICATIONS

This application is related to and claims the priority from Chinese Application No. 201710728382.3, filed on Aug. 23, 2017, entitled "Artificial Intelligence Based Method and Apparatus for Classifying a Voice-recognized Text," the entire disclosure of which is incorporated herein by reference.

TECHNICAL FIELD

The present disclosure relates to the field of computer technology, specifically to the field of computer network technology, and more specifically to an artificial intelligence based method and apparatus for classifying a voice-recognized text.

BACKGROUND

Rapid development of the artificial intelligence (AI) technology facilitates daily work and life. Artificial intelligence is a new technological science that studies and develops theories, methods, techniques and application systems for simulating, extending and expanding human intelligence. Artificial intelligence is a branch of the computer science that attempts to understand the essence of intelligence and produces novel intelligent machinery capable of responding in a way similar to human intelligence. Studies in the field include robots, speech recognition, image recognition, natural language processing, expert systems, and the like. The artificial intelligence is increasingly integrated into applications. Applications combined with the artificial intelligence can accurately determine information types, and push different types of information to appropriate users based on the needs of the different users.

With the rapid development of the artificial intelligence, enabling machineries to have intelligence comparable to the human intelligence is desired by numerous enterprises. In this context, machine is expected to be capable of intelligent voice interaction with users. In the early stage of the intelligent voice interaction service, collected text corpora of users were usually imperfect, and how to cold start classification of these text corpora is a challenging problem for the intelligent voice interaction service. At present, in the face of such a problem as cold starting text classification, the intelligent voice interaction service needs to collect a considerable amount of text corpora, and only after completing manual annotation of the text corpora, can training of each category be performed.

However, the current intelligent voice interaction service fails to effectively and rapidly classify texts in the early stage of the service. Furthermore, manual annotation requires a considerable amount of annotating manpower, thereby resulting in low annotation efficiency.

SUMMARY

An objective of the present disclosure is to provide an improved artificial intelligence based method and apparatus for classifying a voice-recognized text, to solve the technical problems mentioned in the Background section.

In a first aspect, an embodiment of the present disclosure provides an artificial intelligence based method for classifying a voice-recognized text, the method including: acquiring a current interactive text of a voice query from a user; analyzing the current interactive text using a lexical analyzer to obtain a current lexical structure; determining whether the current lexical structure matches a template of a category in a classifier; and classifying, if the current lexical structure matches the template of the category in the classifier, the current interactive text corresponding to the current lexical structure into the category belonging to the matched template.

In some embodiments, the template of the category is determined by the following steps: acquiring a preset category for a predetermined interaction scenario; acquiring a to-be-generalized interactive text having a frequency of occurrence higher than a predetermined frequency in the category; and receiving manual generalization of the to-be-generalized interactive text in the category to obtain the template of the category.

In some embodiments, the method further includes: classifying, if the current lexical structure fails to match the template of the category in the classifier, the current interactive text corresponding to the current lexical structure into a to-be-classified category.

In some embodiments, the method further includes: acquiring a to-be-processed interactive text having a frequency of occurrence higher than a preset frequency in the to-be-classified category; receiving a manually classifying operation of the to-be-processed interactive text; and classifying the to-be-processed interactive text into a category corresponding to the classifying operation in the classifier.

In some embodiments, the classifying the to-be-processed interactive text into a category corresponding to the classifying operation in the classifier includes: classifying, if there is the category corresponding to the classifying operation in the classifier, the to-be-processed interactive text directly into the category corresponding to the classifying operation in the classifier.

In some embodiments, the classifying the to-be-processed interactive text into a category corresponding to the classifying operation in the classifier includes: establishing, if there is no category corresponding to the classifying operation in the classifier, the category corresponding to the classifying operation in the classifier; and classifying the to-be-processed interactive text into the category corresponding to the classifying operation in the classifier.

In some embodiments, the method further includes: receiving manual generalization of the to-be-processed interactive text classified into the category in the classifier; and updating the template of the category in the classifier based on a generalization result.

In a second aspect, an embodiment of the present disclosure further provides an artificial intelligence based apparatus for classifying a voice-recognized text, the apparatus including: a current text acquisition unit, configured to acquire a current interactive text of a voice query from a user; a current text analyzing unit, configured to analyze the current interactive text using a lexical analyzer to obtain a current lexical structure; a template matching determination unit, configured to determine whether the current lexical structure matches a template of a category in a classifier; and a current text classification unit, configured to classify, if the current lexical structure matches the template of the category in the classifier, the current interactive text corresponding to the current lexical structure into the category belonging to the matched template.

In some embodiments, the template of the category in the template matching determination unit is determined by the following units: a preset category acquisition unit, configured to acquire a preset category for a predetermined interaction scenario; a predetermined text acquisition unit, configured to acquire a to-be-generalized interactive text having a frequency of occurrence higher than a predetermined frequency in the category; and a predetermined text generalization unit, configured to receive manual generalization of the to-be-generalized interactive text in the category to obtain the template of the category.

In some embodiments, the apparatus further includes: a current text to-be-classifying unit, configured to classify, if the current lexical structure fails to match the template of the category in the classifier, the current interactive text corresponding to the current lexical structure into a to-be-classified category.

In some embodiments, the apparatus further includes: a to-be-processed text acquisition unit, configured to acquire a to-be-processed interactive text having a frequency of occurrence higher than a preset frequency in the to-be-classified category; a classifying operation receiving unit, configured to receive a manually classifying operation of the to-be-processed interactive text; and a to-be-processed text classification unit, configured to classify the to-be-processed interactive text into the category corresponding to the classifying operation in the classifier.

In some embodiments, the to-be-processed text classification unit is further configured to: classify, if there is the category corresponding to the classifying operation in the classifier, the to-be-processed interactive text directly into the category corresponding to the classifying operation in the classifier.

In some embodiments, the to-be-processed text classification unit is further configured to: establish, if there is no category corresponding to the classifying operation in the classifier, the category corresponding to the classifying operation in the classifier; and classify the to-be-processed interactive text into the category corresponding to the classifying operation in the classifier.

In some embodiments, the apparatus further includes: a to-be-processed text generalization unit, configured to receive manual generalization of the to-be-processed interactive text classified into the category in the classifier; and a category template updating unit, configured to update the template of the category in the classifier based on a generalization result.

In a third aspect, an embodiment of the present disclosure provides a device, including: one or more processors; and a memory, for storing one or more programs, the one or more programs, when executed by the one or more processors, cause the one or more processors to implement the artificial intelligence based method for classifying a voice-recognized text according to any one of the above embodiments.

In a fourth aspect, an embodiment of the present disclosure provides a computer readable storage medium storing a computer program thereon, the program, when executed by a processor, implements the artificial intelligence based method for classifying a voice-recognized text according to any one of the above embodiments.

An artificial intelligence based method and apparatus for classifying a voice-recognized text provided by an embodiment of the present disclosure firstly acquire a current interactive text of a voice query from a user; then analyze the current interactive text using a lexical analyzer to obtain a current lexical structure; then determine whether the current lexical structure matches a template of a category in a classifier; and finally classify, if the current lexical structure matches the template of the category in the classifier, the current interactive text corresponding to the current lexical structure into the category belonging to the matched template. The artificial intelligence based method and apparatus for classifying a voice-recognized text provided by the embodiment can fast classify texts in the intelligent voice interaction service.

In some embodiments, the current interactive text corresponding to the current lexical structure failing to match the template of the category in the classifier is classified into a to-be-classified category, then a manually classifying operation of a to-be-processed interactive text having a frequency of occurrence higher than a preset frequency is received, and then the to-be-processed interactive text is classified into a category corresponding to the classifying operation in the classifier, thereby effectively reducing the magnitude of manually annotated texts, and improving the annotation efficiency.

BRIEF DESCRIPTION OF THE DRAWINGS

By reading and referring to detailed description of non-limiting embodiments in the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
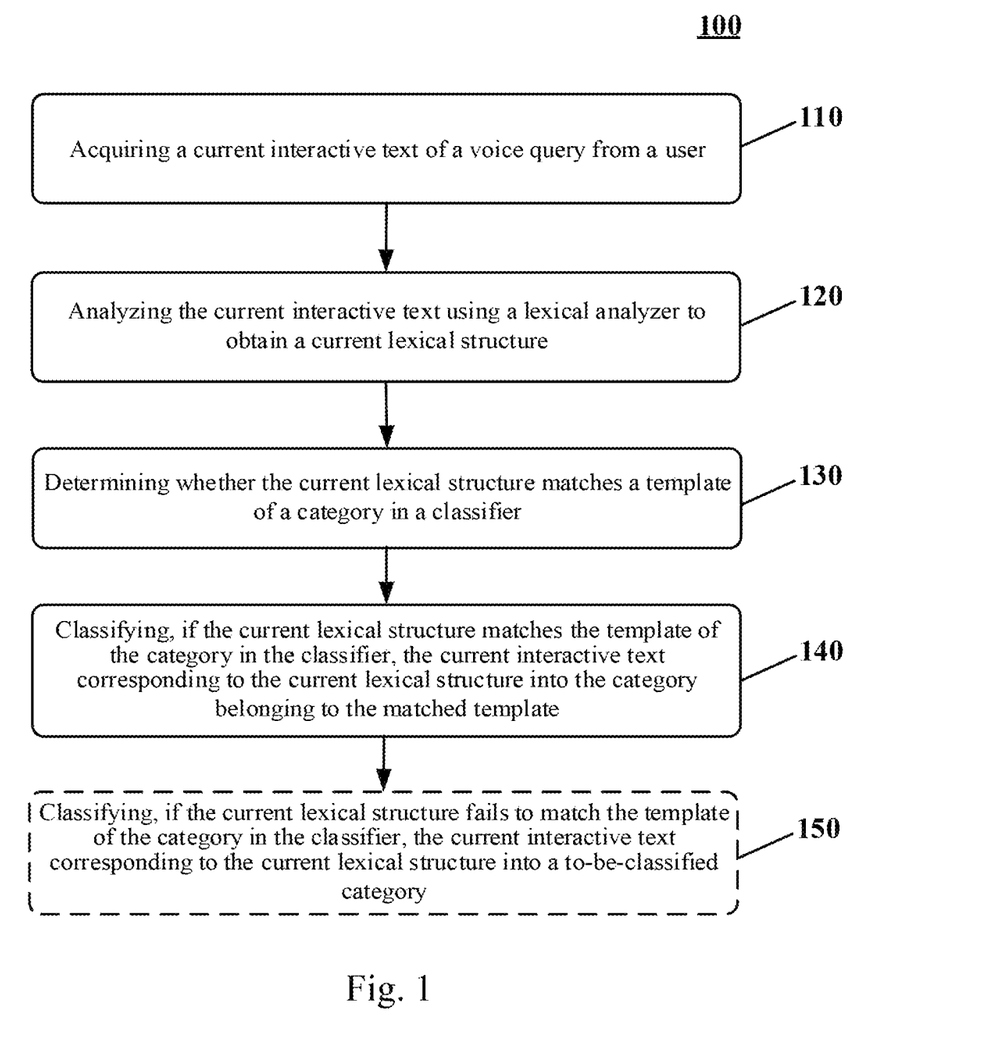
FIG. 1 is a schematic flowchart of an embodiment of an artificial intelligence based method for classifying a voice-recognized text according to the present disclosure.

FIG. 1 is a flow 100 of an embodiment of an artificial intelligence based method for classifying a voice-recognized text according to the present disclosure. The artificial intelligence based method for classifying a voice-recognized text includes:

Step 110: acquiring a current interactive text of a voice query from a user.

In the embodiment, an electronic device running an artificial intelligence based method for classifying a voice-recognized text may acquire a voice query from a user, and then obtain a current interactive text by voice recognition of the voice query; and may also directly acquire the current interactive text by pre-recognizing the voice query from the user.

Step 120: analyzing the current interactive text using a lexical analyzer to obtain a current lexical structure.

In the embodiment, after acquiring a current interactive text of a voice query from a user, the current interactive text may be analyzed using a lexical analyzer to obtain a current lexical structure. The lexical analyzer here may be a lexical analyzer for extracting a current lexical structure in existing technologies or technologies to be developed in the future, and is not limited in the present disclosure. For example, a lexical analyzer Lexparser (a Lex-based lexical analyzer, where Lex is the abbreviation of lexical compiler, is a tool in a UNIX environment, has the main function of generating a C source code of a lexical analyzer (scanner), and uses a descriptive rule of a regular expression) may be used to analyze the current interactive text.

Step 130: determining whether the current lexical structure matches a template of a category in a classifier.

In the embodiment, the template of a category in a classifier may be a predefined template for the category in the classifier. The template of a category may be a manually defined template, and may also be a template derived from other applications. The category here may be predefined by a skilled person based on a voice interaction scenario. For example, in a vehicular voice interaction scenario, categories, such as a navigation category, an instruction category, and a music category, may be defined; while in a children's voice interaction scenario, categories, such as a nursery rhyme category, a story category, an ancient poem category, and a portrayal category, may be defined.

In some alternative implementations of the embodiment, the template of the category may be determined by the following steps: acquiring a preset category for a predetermined interaction scenario; acquiring a to-be-generalized interactive text having a frequency of occurrence higher than a predetermined frequency in the category; and receiving manual generalization of the to-be-generalized interactive text in the category to obtain the template of the category.

In the implementation, the to-be-generalized interactive text having a frequency of occurrence higher than a predetermined frequency in the category refers to a manually collected common interactive text in the category. Generalization refers to expansion of a specific and individual interactive text to a general interactive text. For example, for the portrayal category, a common interactive text expressed as "you" or "thou" may be generalized to "you," "when" and "what time" may be generalized to "when," and "birth" and "birthday" and the like may be generalized to "birth." Thus, a template "you+when+birth" is obtained, and then these templates may be used as the basis for classifying the category. When receiving manual generalization of a to-be-generalized interactive text in a category, a generalized vocabulary between a lexical structure of the to-be-generalized interactive text and a generalization template may also be generated.

A current interactive text of a voice query may be classified through a template of a category without the need of manually annotating the current interactive text of a possible voice query. For example, for a current interactive text of a voice query "When is your birthday," if a user changes a way to ask "When were you born," and if there is no annotated recognized text "when were you born," it cannot be classified using the annotation method of the existing technology, but may be classified using the template of the category obtained by generalization according to the present disclosure.

Step 140: classifying, if the current lexical structure matches the template of the category in the classifier, the current interactive text corresponding to the current lexical structure into the category belonging to the matched template.

In the embodiment, whether the current lexical structure matches the generalized vocabulary may be determined based on the generalized vocabulary previously generated when determining the template of the category. If the current lexical structure matches the generalized vocabulary, then it means that the current lexical structure matches the template of the category in the classifier. Under the circumstance, the current interactive text corresponding to the current lexical structure may be classified into the category belonging to the matched template.

Alternatively, step 150: classifying, if the current lexical structure fails to match the template of the category in the classifier, the current interactive text corresponding to the current lexical structure into a to-be-classified category.

In the embodiment, the current interactive text is classified into a to-be-classified category for subsequent processing. For example, when interactive texts in a to-be-classified category satisfy a processing condition (for example, after reaching a certain number or after an interval of a predetermined duration), interactive texts having a frequency of occurrence higher than a preset frequency in the to-be-classified category may be processed manually, thus effectively reducing the magnitude of manually annotated texts, and improving the annotation efficiency. Here, the optional step 150 is not an essential step in the embodiment, and the embodiment of the present disclosure may also only include step 110 to step 140.

The artificial intelligence based method for classifying a voice-recognized text provided by the embodiment of the present disclosure can fast classify a current interactive text in the intelligent voice interaction service, and may classify, in some optional schemes, a current unclassified interactive text into a to-be-classified category for subsequently processing the interactive text in the to-be-classified category when the interactive text in the to-be-classified category satisfies a processing condition (for example, after reaching a certain number or after an interval of a predetermined duration), thus effectively reducing the magnitude of manually annotated texts, and improving the annotation efficiency.

Figure 2:
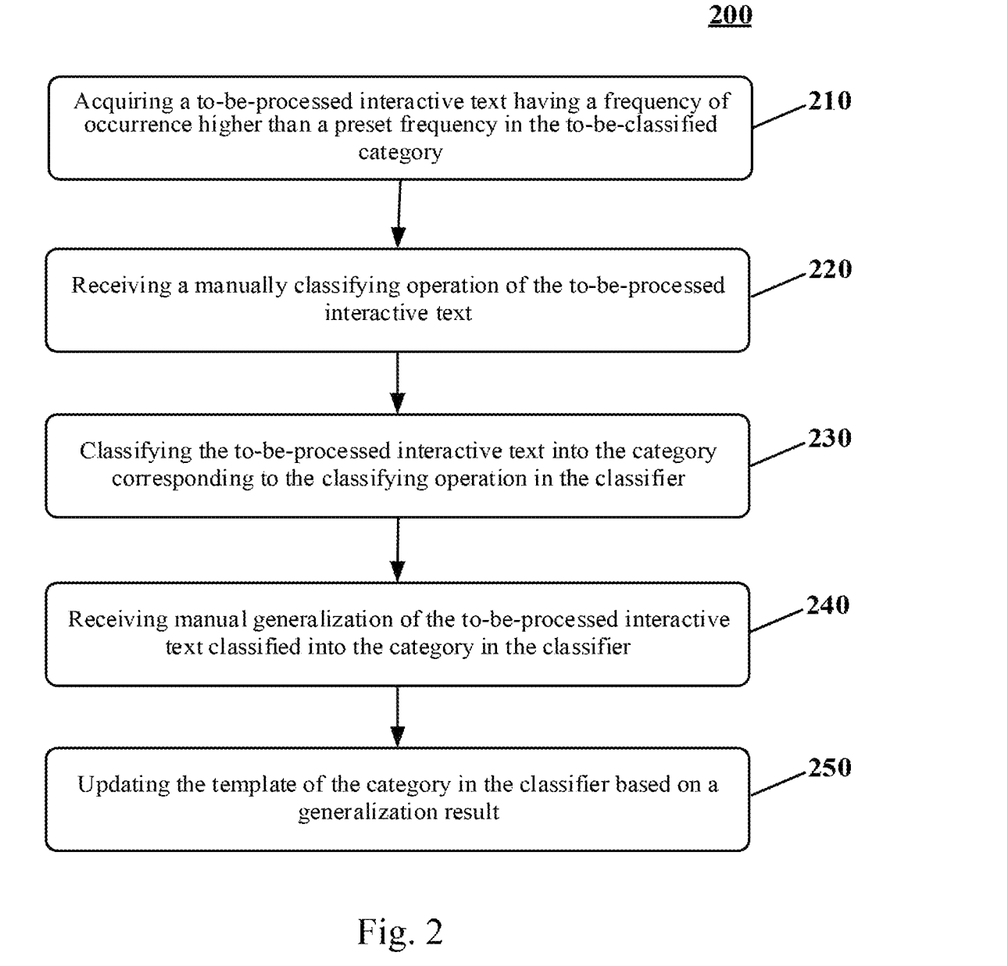
FIG. 2 is a schematic flowchart of an embodiment of a method for updating a template of a category in a classifier in the artificial intelligence based method for classifying a voice-recognized text according to the present disclosure.

Furthermore, referring to FIG. 2, a schematic flow of an embodiment of a method for updating a template of a category in a classifier in the artificial intelligence based method for classifying a voice-recognized text according to the present disclosure is shown.

As shown in FIG. 2, a method 200 for updating a template of a category in a classifier includes:

Step 210: acquiring a to-be-processed interactive text having a frequency of occurrence higher than a preset frequency in the to-be-classified category.

In the embodiment, after the artificial intelligence based method for classifying a voice-recognized text as shown in FIG. 1 runs for a period of time, the to-be-classified category will include some unclassified interactive texts. When these interactive texts satisfy a processing condition (for example, after reaching a certain number or after an interval of a predetermined duration), interactive texts having a frequency of occurrence higher than a preset frequency may be selected from the unclassified interactive texts for use as to-be-processed interactive texts, i.e., texts of voice queries frequently asked by users, for subsequent processing. It should be appreciated that, the preset frequency here may be identical to, or different from, the predetermined frequency in the alternative implementation of the step 130, which is not limited in the present disclosure.

Step 220: receiving a manually classifying operation of the to-be-processed interactive text.

In the embodiment, the to-be-processed interactive texts obtained in step 210 may be manually processed again, their categories may be analyzed, and their templates may be generalized to realize a template iteration of the classifier, thus greatly reducing the magnitude of manually annotated texts, and improving the annotation efficiency.

Step 230: classifying the to-be-processed interactive text into a category corresponding to the classifying operation in the classifier.

In the embodiment, in the early stage of the running of the artificial intelligence based method for classifying a voice-recognized text, there will be a few templates of a category, while with the continuous running of the method, there will be more interactive texts corresponding to voice queries from the users. Under the circumstance, these increased unclassified interactive texts corresponding to voice queries may be classified manually.

Specifically, in a classifying operation, the to-be-processed interactive text may be classified into a category corresponding to the classifying operation in the classifier based on whether there is a category corresponding to the classifying operation in the classifier: if there is a category corresponding to the classifying operation in the classifier, the to-be-processed interactive text is directly classified into the category corresponding to the classifying operation in the classifier. If there is no category corresponding to the classifying operation in the classifier, the category corresponding to the classifying operation is established in the classifier; and the to-be-processed interactive text is classified into the category corresponding to the classifying operation in the classifier. For example, in a vehicular scenario, because a large number of users ask questions involving weather, a category "weather" may be added.

Step 240: receiving manual generalization of the to-be-processed interactive text classified into the category in the classifier.

In the embodiment, the template may be manually generalized for the to-be-processed interactive text reclassified in step 230. The generalization process may be referred to the process of template generalization in the artificial intelligence based method for classifying a voice-recognized text as shown in FIG. 1. Here, detailed description thereof will be omitted.

Step 250: updating the template of the category in the classifier based on a generalization result.

In the embodiment, based on a generalization result in step 240, if the template of the category in the classifier does not contain the generalization result, the generalization result is updated to the template of the category in the classifier. For example, in a vehicular scenario, because a large number of users ask questions involving weather, a category "weather" may be added, the to-be-processed interactive text in the category "weather" may be generalized, and the template of the category "weather" may be updated.

It should be appreciated that the embodiment of FIG. 2 implemented on the basis of FIG. 1 is only an illustrative embodiment of the present disclosure, and does not limit the present disclosure. For example, another embodiment of the present disclosure may only include step 110 to step 150, and step 210 to step 230.

The method for updating a template of a category in a classifier in the artificial intelligence based method for classifying a voice-recognized text provided by the above embodiment of the present disclosure may continuously update the category and the template of the category in the classifier in the process of classifying a voice-recognized text, effectively reduce the magnitude of manually annotated texts, and improve the annotation efficiency.

An exemplary application scenario of the artificial intelligence based method for classifying a voice-recognized text according to an embodiment of the present disclosure is described below with reference to FIG. 3.

Figure 3:
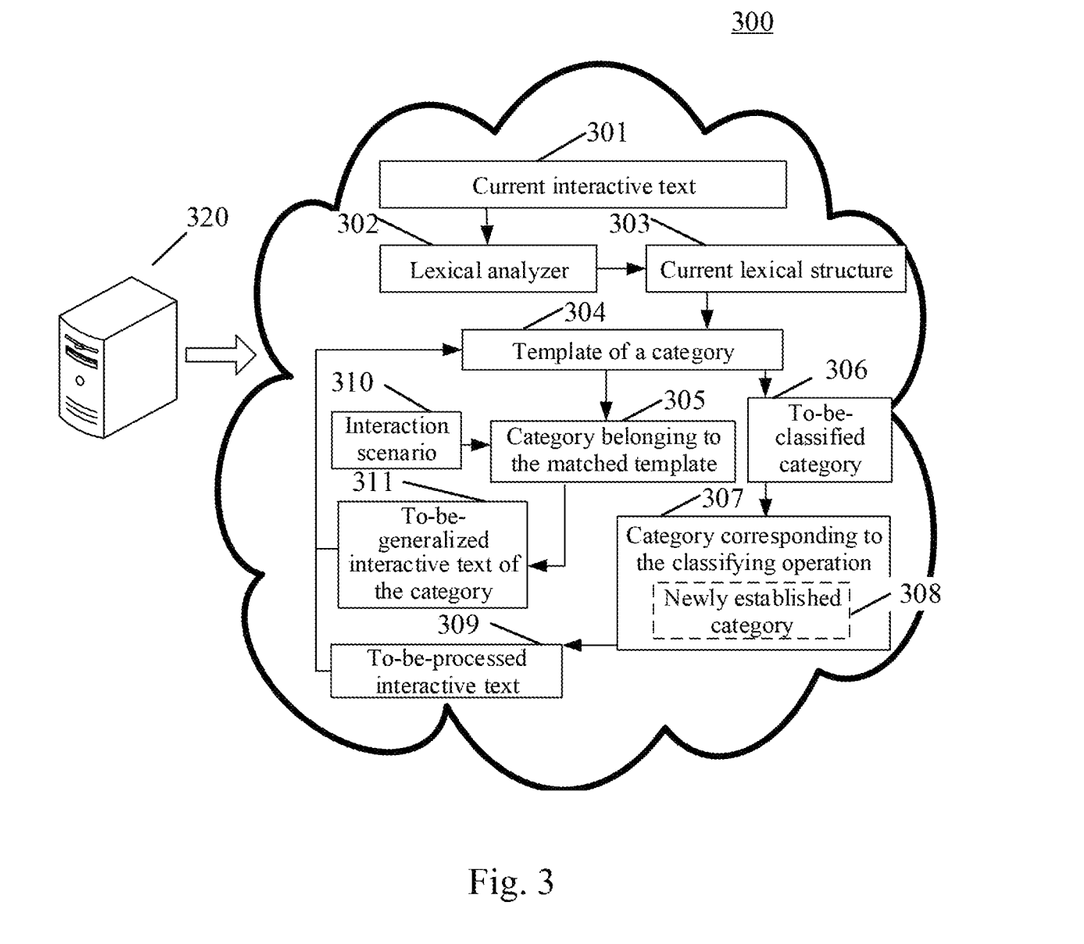
FIG. 3 is a schematic flowchart of an application scenario of the artificial intelligence based method for classifying a voice-recognized text according to an embodiment the present disclosure.

As shown in FIG. 3, a schematic flowchart of an application scenario of the artificial intelligence based method for classifying a voice-recognized text according to an embodiment the present disclosure is illustrated.

As shown in FIG. 3, an artificial intelligence based method 300 for classifying a voice-recognized text according to an embodiment of the present disclosure may run in an electronic device 320.

First, the electronic device 320 acquires a current interactive text 301 of a voice query from a user; then analyzes the current interactive text 301 using a lexical analyzer 302 to obtain a current lexical structure 303; then determines whether the current lexical structure 303 matches a template 304 of a category in a classifier; then classifies, if the current lexical structure 303 matches the template 304 of the category in the classifier, the current interactive text 301 corresponding to the current lexical structure 303 into a category 305 belonging to the matched template; classifies, if the current lexical structure 303 fails to match the template 304 of the category in the classifier, the current interactive text 301 corresponding to the current lexical structure into a to-be-classified category 306; then acquires a to-be-processed interactive text having a frequency of occurrence higher than a preset frequency in the to-be-classified category 306, receives a manually classifying operation of the to-be-processed interactive text, and classifies the to-be-processed interactive text in the to-be-classified category into a category 307 corresponding to the classifying operation in the classifier, establishes, if there is no category corresponding to the classifying operation in the classifier, the category (newly established category 308) corresponding to the classifying operation in the classifier, and classifies the to-be-processed interactive text into the category corresponding to the classifying operation in the classifier; then receives manual generalization of the to-be-processed interactive text 309 having a high frequency classified into the category in the classifier; and then updates the template 304 of the category in the classifier.

Here, for the initial template 304 of the category, a to-be-generalized interactive text 311 of the category may be manually determined based on a predetermined category in a predetermined interaction scenario 310, and then the to-be-generalized interactive text 311 may be manually generalized to obtain the initial template 304 of the category.

The artificial intelligence based method for classifying a voice-recognized text provided in the above application scenario of the present disclosure can fast classify texts in the intelligent voice interaction service, and may continuously update the category and the template of the category in the classifier during the intelligent voice interaction service, thereby effectively reducing the magnitude of manually annotated texts, and improving the annotation efficiency.

Figure 4:
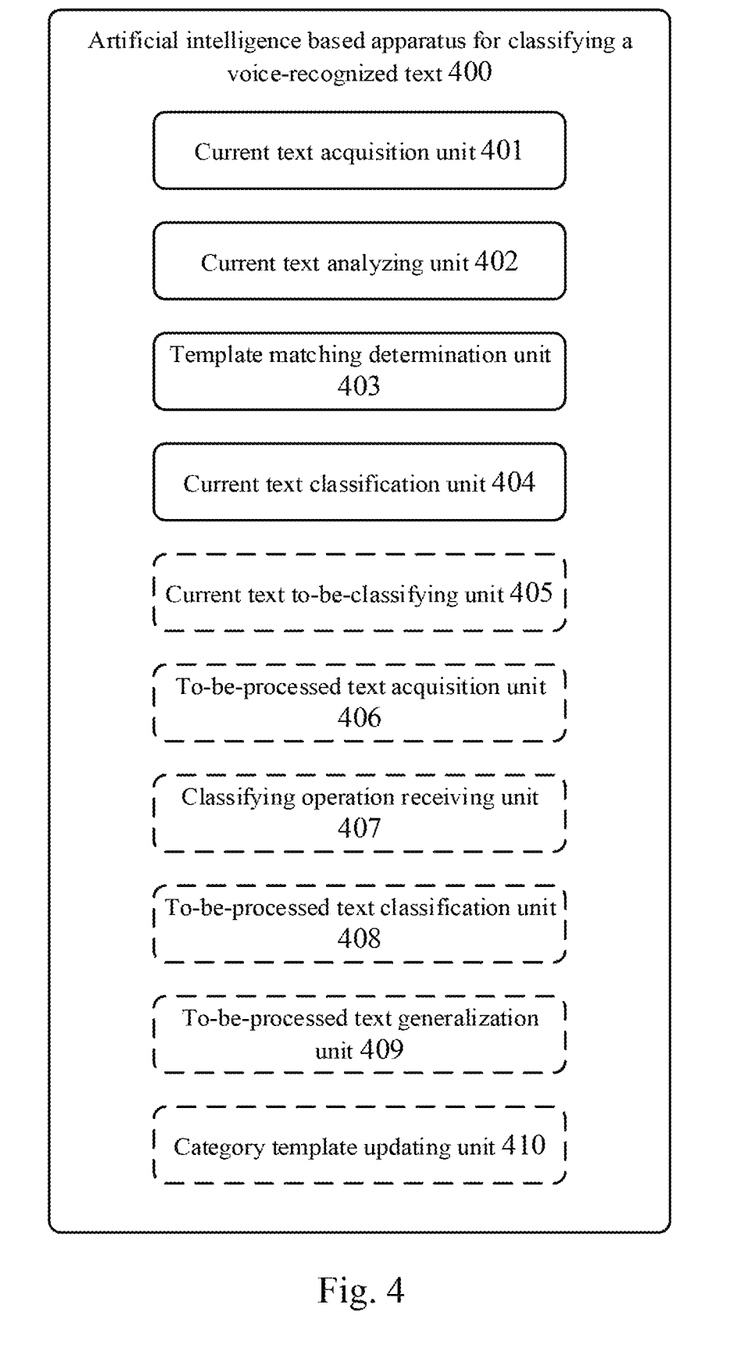
FIG. 4 is an exemplary structural diagram of an embodiment of an artificial intelligence based apparatus for classifying a voice-recognized text according to the present disclosure.

With further reference to FIG. 4, as an implementation to the above method, the embodiment of the present disclosure provides an embodiment of an artificial intelligence based apparatus for classifying a voice-recognized text, and the embodiment of the artificial intelligence based apparatus for classifying a voice-recognized text corresponds to the embodiment of the artificial intelligence based method for classifying a voice-recognized text as shown in FIG. 1 to FIG. 3. Thus, the operations and characteristics described in the artificial intelligence based method for classifying a voice-recognized text in FIG. 1 to FIG. 3 hereinbefore also apply to an artificial intelligence based apparatus 400 for classifying a voice-recognized text and units contained therein. Here, detailed description thereof will be omitted.

As shown in FIG. 4, the artificial intelligence apparatus 400 for classifying a voice-recognized text includes: a current text acquisition unit 401, a current text analyzing unit 402, a template matching determination unit 403 and a current text classification unit 404.

The current text acquisition unit 401 is configured to acquire a current interactive text of a voice query from a user. The current text analyzing unit 402 is configured to analyze the current interactive text using a lexical analyzer to obtain a current lexical structure. The template matching determination unit 403 is configured to determine whether the current lexical structure matches a template of a category in a classifier. The current text classification unit 404 is configured to classify, if the current lexical structure matches the template of the category in the classifier, the current interactive text corresponding to the current lexical structure into the category belonging to the matched template.

In some alternative implementations of the embodiment, the template of the category in the template matching determination unit 403 is determined by the following units (not shown in the figure): a preset category acquisition unit, configured to acquire a preset category for a predetermined interaction scenario; a predetermined text acquisition unit, configured to acquire a to-be-generalized interactive text having a frequency of occurrence higher than a predetermined frequency in the category; and a predetermined text generalization unit, configured to receive manual generalization of the to-be-generalized interactive text in the category to obtain the template of the category.

In some alternative implementations of the embodiment, the apparatus further includes: a current text to-be-classifying unit 405, configured to classify, if the current lexical structure fails to match the template of the category in the classifier, the current interactive text corresponding to the current lexical structure into a to-be-classified category.

In some alternative implementations of the embodiment, the apparatus further includes: a to-be-processed text acquisition unit 406, configured to acquire a to-be-processed interactive text having a frequency of occurrence higher than a preset frequency in the to-be-classified category; a classifying operation receiving unit 407, configured to receive a manually classifying operation of the to-be-processed interactive text; and a to-be-processed text classification unit 408, configured to classify the to-be-processed interactive text into the category corresponding to the classifying operation in the classifier.

In some alternative implementations of the embodiment, the to-be-processed text classification unit is further configured to: classify, if there is the category corresponding to the classifying operation in the classifier, the to-be-processed interactive text directly into the category corresponding to the classifying operation in the classifier.

In some alternative implementations of the embodiment, the to-be-processed text classification unit is further configured to: establish, if there is no category corresponding to the classifying operation in the classifier, the category corresponding to the classifying operation in the classifier; and classify the to-be-processed interactive text into the category corresponding to the classifying operation in the classifier.

In some alternative implementations of the embodiment, the apparatus further includes: a to-be-processed text generalization unit 409, configured to receive manual generalization of the to-be-processed interactive text classified into the category in the classifier; and a category template updating unit 410, configured to update the template of the category in the classifier based on a generalization result.

The present disclosure further provides an embodiment of a device, including: one or more processors; and a memory, for storing one or more programs, the one or more programs, when executed by the one or more processors, cause the one or more processors to implement the artificial intelligence based method for classifying a voice-recognized text according to any one of the above embodiments.

The present disclosure further provides an embodiment of a computer readable storage medium storing a computer program thereon, the program, when executed by a processor, implements the artificial intelligence based method for classifying a voice-recognized text according to any one of the above embodiments.

Figure 5:
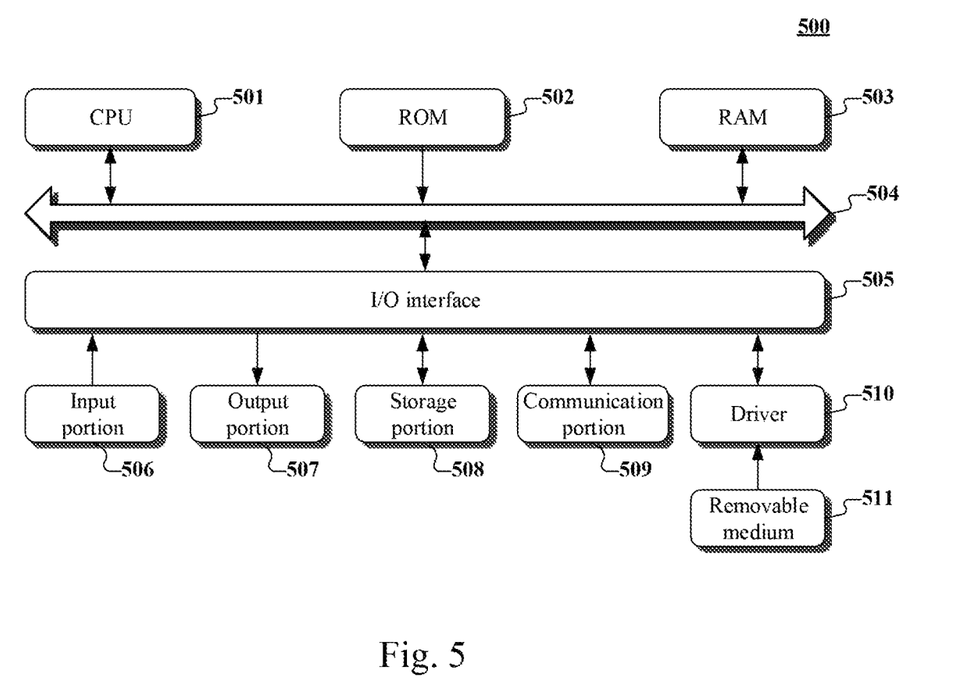
FIG. 5 is a schematic structural diagram of a computer system suitable for implementing a terminal device or a server according to an embodiment of the present disclosure.

With reference to FIG. 5, a schematic structural diagram of a computer system 500 suitable for implementing a terminal device or a server according to an embodiment of the present disclosure is shown. The terminal device 12 shown in FIG. 5 is only an example and should not impose any limitation to the function and scope of use of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A drive 510 is also connected to the I/O interface 505 as required. A removable medium 511, such as a magnetic disk, an optical disk, a magneto-optical disk, and a semiconductor memory, may be installed on the drive 510, to facilitate the retrieval of a computer program from the removable medium 511, and the installation thereof on the storage portion 508 as needed.

In particular, according to embodiments of the present disclosure, the process described above with reference to the flowchart may be implemented in a computer software program. For example, an embodiment of the present disclosure includes a computer program product, which comprises a computer program that is tangibly embedded in a machine-readable medium. The computer program comprises program codes for executing the method as illustrated in the flowchart. In such an embodiment, the computer program may be downloaded and installed from a network via the communication portion 509, and/or may be installed from the removable medium 511. The computer program, when executed by the central processing unit (CPU) 501, implements the above mentioned functionalities as defined by the method of the present disclosure.

It should be noted that the computer readable medium in the present disclosure may be a computer readable signal medium or a computer readable storage medium or any combination thereof. An example of the computer readable storage medium may include, but not limited to: an electronic, magnetic, optical, electromagnetic, infrared, or semiconductor system, apparatus, element, or a combination any of the above. A more specific example of the computer readable storage medium may include but is not limited to: electrical connection with one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include a data signal that propagates in baseband or as part of a carrier wave carrying computer readable program codes. The data signal propagated in this way may take a variety of forms, including but not limited to electromagnetic signals, optical signals, or any suitable combination of the above. The computer readable signal medium may also be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF, etc., or any suitable combination of the above.

The flowcharts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a unit, a program segment, or a code portion, the unit, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a current text acquisition unit, a current text analyzing unit, a template matching determination unit and a current text classification unit. For example, the current text acquisition unit may also be described as "a unit configured to acquire a current interactive text of a voice query from a user."

In another aspect, the present disclosure further provides a non-transitory computer storage medium. The non-transitory computer storage medium may be the non-transitory computer storage medium included in the apparatus in the above described embodiments, or a stand-alone non-transitory computer storage medium not assembled into the terminal. The non-transitory computer storage medium stores one or more programs. The one or more programs, when executed by a device, cause the device to: acquire a current interactive text of a voice query from a user; analyze the current interactive text using a lexical analyzer to obtain a current lexical structure; determine whether the current lexical structure matches a template of a category in a classifier; and classify, if the current lexical structure matches the template of the category in the classifier, the current interactive text corresponding to the current lexical structure into the category belonging to the matched template.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An artificial intelligence based method for classifying a voice-recognized text, the method comprising:
   acquiring a current interactive text of a voice query from a user;
   analyzing the current interactive text using a lexical analyzer to obtain a current lexical structure;
   determining whether the current lexical structure matches a template of a given category in a classifier; and
   classifying, if the current lexical structure matches the template of the given category in the classifier, the current interactive text corresponding to the current lexical structure into the given category belonging to the matched template, wherein the template in the given category includes a plurality of keywords, and each of the keywords of the template in the given category is determined by:
   acquiring the given category for a predetermined interaction scenario;
   acquiring a plurality of pieces of to-be-generalized interactive text having same or similar meanings in the given category;
   generating one generalized keyword matching the pieces of to-be-generalized interactive text having same or similar meanings in the given category; and
   using the generalized keyword as the keyword of the template in the given category.

2. The method according to claim 1, wherein
the to-be-generalized interactive text has a frequency of occurrence higher than a predetermined frequency in the category.

3. The method according to claim 1, further comprising:
classifying, if the current lexical structure fails to match the template of the category in the classifier, the current interactive text corresponding to the current lexical structure into a to-be-classified category.

4. The method according to claim 1, further comprising:
acquiring a to-be-processed interactive text having a frequency of occurrence higher than a preset frequency in the to-be-classified category;
receiving a manually classifying operation of the to-be-processed interactive text; and
classifying the to-be-processed interactive text into a category corresponding to the classifying operation in the classifier.

5. The method according to claim 4, wherein the classifying the to-be-processed interactive text into a category corresponding to the classifying operation in the classifier comprises:
classifying, if there is the category corresponding to the classifying operation in the classifier, the to-be-processed interactive text directly into the category corresponding to the classifying operation in the classifier.

6. The method according to claim 4, wherein the classifying the to-be-processed interactive text into a category corresponding to the classifying operation in the classifier comprises:
establishing, if there is no category corresponding to the classifying operation in the classifier, the category corresponding to the classifying operation in the classifier; and
classifying the to-be-processed interactive text into the category corresponding to the classifying operation in the classifier.

7. The method according to claim 4, further comprising:
receiving manual generalization of the to-be-processed interactive text classified into the category in the classifier; and
updating the template of the category in the classifier based on a generalization result.

8. The method according to claim 1, wherein the current lexical structure including a plurality of pieces matching all keywords of the template is classified into the given category.

9. An artificial intelligence based apparatus for classifying a voice-recognized text, the apparatus comprising:
at least one processor; and
a memory storing instructions, the instructions when executed by the at least one processor, cause the at least one processor to perform operations, the operations comprising:
acquiring a current interactive text of a voice query from a user;
analyzing the current interactive text using a lexical analyzer to obtain a current lexical structure;
determining whether the current lexical structure matches a template of a given category in a classifier; and
classifying, if the current lexical structure matches the template of the given category in the classifier, the current interactive text corresponding to the current lexical structure into the given category belonging to the matched template, wherein the template in the given category includes a plurality of keywords, and each of the keywords of the template in the given category is determined by:
acquiring the given category for a predetermined interaction scenario;
acquiring a plurality of pieces of to-be-generalized interactive text having same or similar meanings in the given category;
generating one generalized keyword matching the pieces of to-be-generalized interactive text having same or similar meanings in the given category; and
using the generalized keyword as the keyword of the template in the given category.

10. The apparatus according to claim 9, wherein
the to-be-generalized interactive text has a frequency of occurrence higher than a predetermined frequency in the category.

11. The apparatus according to claim 9, wherein the operations further comprise:
classifying, if the current lexical structure fails to match the template of the category in the classifier, the current interactive text corresponding to the current lexical structure into a to-be-classified category.

12. The apparatus according to claim 9, wherein the operations further comprise:
acquiring a to-be-processed interactive text having a frequency of occurrence higher than a preset frequency in the to-be-classified category;
receiving a manually classifying operation of the to-be-processed interactive text; and
classifying the to-be-processed interactive text into a category corresponding to the classifying operation in the classifier.

13. The apparatus according to claim 12, wherein the classifying the to-be-processed interactive text into a category corresponding to the classifying operation in the classifier comprises:
classifying, if there is the category corresponding to the classifying operation in the classifier, the to-be-processed interactive text directly into the category corresponding to the classifying operation in the classifier.

14. The apparatus according to claim 12, wherein the classifying the to-be-processed interactive text into a category corresponding to the classifying operation in the classifier comprises:
establishing, if there is no category corresponding to the classifying operation in the classifier, the category corresponding to the classifying operation in the classifier; and
classifying the to-be-processed interactive text into the category corresponding to the classifying operation in the classifier.

15. The apparatus according to claim 12, wherein the operations further comprise:
receiving manual generalization of the to-be-processed interactive text classified into the category in the classifier; and
updating the template of the category in the classifier based on a generalization result.

16. A non-transitory computer readable storage medium storing a computer program, wherein the computer program, when executed by a processor, cause the processor to perform operations, the operation comprising:
acquiring a current interactive text of a voice query from a user;
analyzing the current interactive text using a lexical analyzer to obtain a current lexical structure;

determining whether the current lexical structure matches a template of a given category in a classifier; and classifying, if the current lexical structure matches the template of the given category in the classifier, the current interactive text corresponding to the current lexical structure into the given category belonging to the matched template, wherein the template in the given category includes a plurality of keywords, and each of the keywords of the template in the given category is determined by:

acquiring the given category for a predetermined interaction scenario;

acquiring a plurality of pieces of to-be-generalized interactive text having same or similar meanings in the given category;

generating one generalized keyword matching the pieces of to-be-generalized interactive text having same or similar meanings in the given category; and using the generalized keyword as the keyword of the template in the given category.

\* \* \* \* \*